Figure 1:
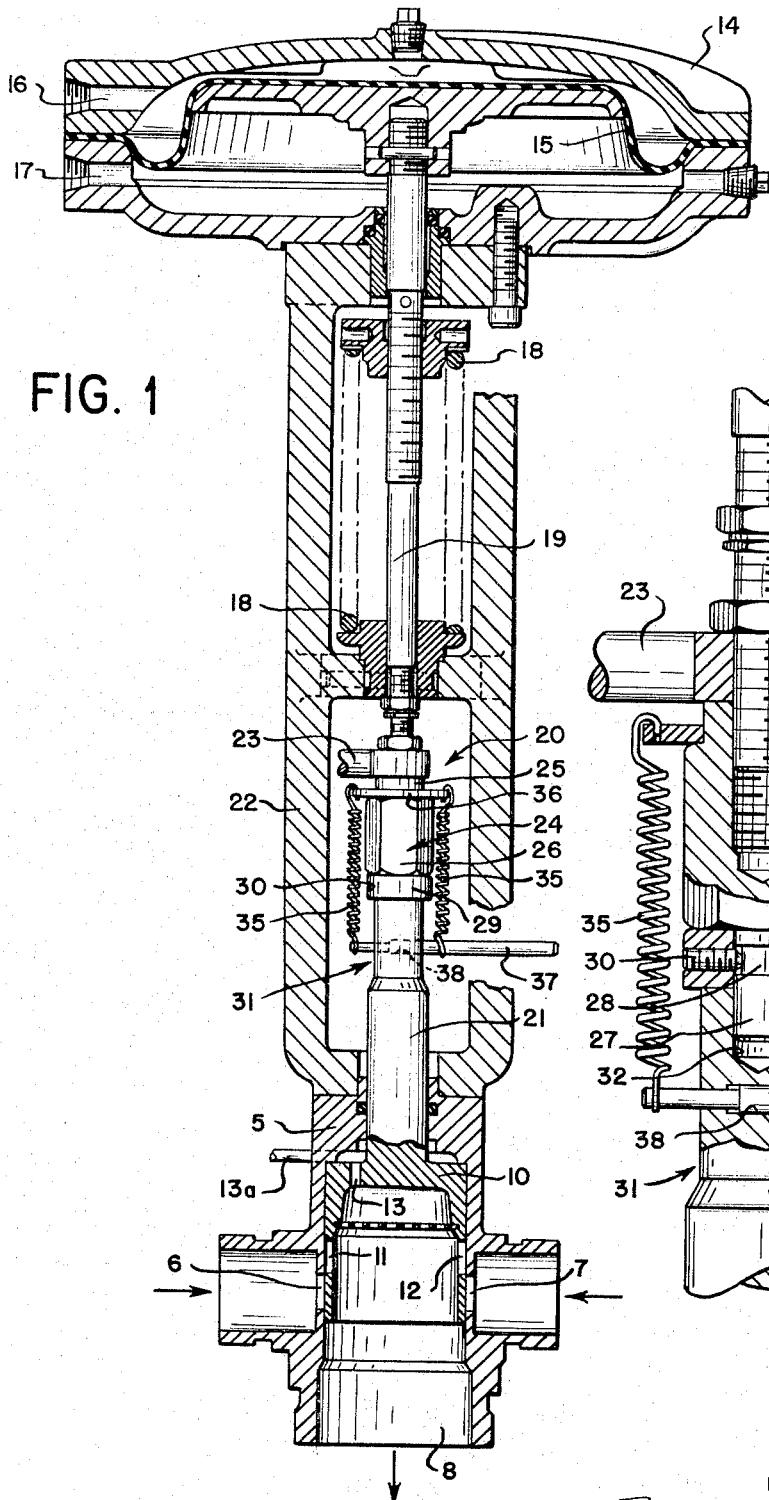

Oct. 17, 1967   J. T. MULLER ET AL   3,347,268
YIELDING SAFETY CONNECTOR AND ANTIVIBRATION LOCK
FOR BLENDING VALVE
Filed June 11, 1965

INVENTORS
JOHN T. MULLER
CURT A. SODERBERG
BY
ATTORNEYS 3,347,268
YIELDING SAFETY CONNECTOR AND ANTI-VIBRATION LOCK FOR BLENDING VALVE
John T. Muller, Nutley, and Curt A. Soderberg, Clifton, N.J., assignors to Leslie Co., Lyndhurst, N.J., a corporation of New Jersey
Filed June 11, 1965, Ser. No. 463,232
5 Claims. (Cl. 137—625.17)

This invention relates to hot water heater systems and, more particularly, to a yielding safety connector and anti-vibration lock for the controlled blending valve in such a system.

In a recently developed hot water heater system, a blending valve is incorporated in order to blend appropriate proportions of cold water and hot water to provide a supply of temperate water on demand. The blending valve, which is of conventional design, has a cold water inlet, a hot water inlet and a temperate water outlet. A valve sleeve is positioned within the valve so as to control the flow of cold and hot water through their rspective inlets. The valve sleeve is provided with specially designed openings or "windows" which are aligned with the cold water and hot water inlets so that axial rotation of the sleeve provides relatively different proportioning of cold and hot water and so that axial longitudinal movement of the sleeve provides the desired control of cold water and hot water to meet the demand for temperate water. The rotational movement of the sleeve is manually adjustable, but the axial movement of the sleeve in the aforementioned system is provided by a control element sensitive to the differential in pressure, if any, between either of the inlet sides and the demand side of the valve. The supply of heat to the hot water heater of the system is also controlled by axial movement of the blending valve stem which interconnects the valve sleeve and its control element.

It has been found in practice that loosened scale and other large foreign matter can lodge in the window of the blending valve sleeve and prevent its proper operation. Thus, when there is a demand for temperate water, as evidenced by a pressure drop in the demand line caused by opening of a faucet, the difference in demand and supply water pressure causes the blending valve control element to move the valve stem axially and thus open the cold and hot water inlets to the valve. If scale or other hard material becomes lodged between either of the valve windows and its respective inlet when the demand for temperate water ceases, the effort of the control element to move the valve stem axially to the valve-closed position is resisted. Termination of the demand under these conditions ends the flow of hot and cold water into the blending valve, but if the valve stem is still held in the valve-open position, the heat supply to the water heater, which is controlled by the position of the valve stem, remains in the "on" position and, at low demands for temperate water, overheated water will result.

It has now been found that this condition can be overcome by providing the blending valve stem with a resilient connector which permits the blending valve to stay open, if it is stuck, yet permits the blending valve control element to return to the "closed" position that portion of the valve stem which controls the heat supply to the water heater. The resilient connector of the present invention, which also permits anti-vibration locking of the blending ratio setting in the valve, comprises a control element portion having an axially extending projecting portion and a blending valve portion having an axially positioned recess adapted to receive the projecting portion of the control element portion in axially slidable relation. The blending valve portion is provided with a longitudinally extending keyway, and a locking element is radially adjustably secured to the projecting portion of the control element portion, the locking element being provided with a projecting key portion adapted to slidably engage the keyway in the blending valve portion. Resilient means is provided for interconnecting the control element portion and the blending valve portion of the connector.

Figure 2:
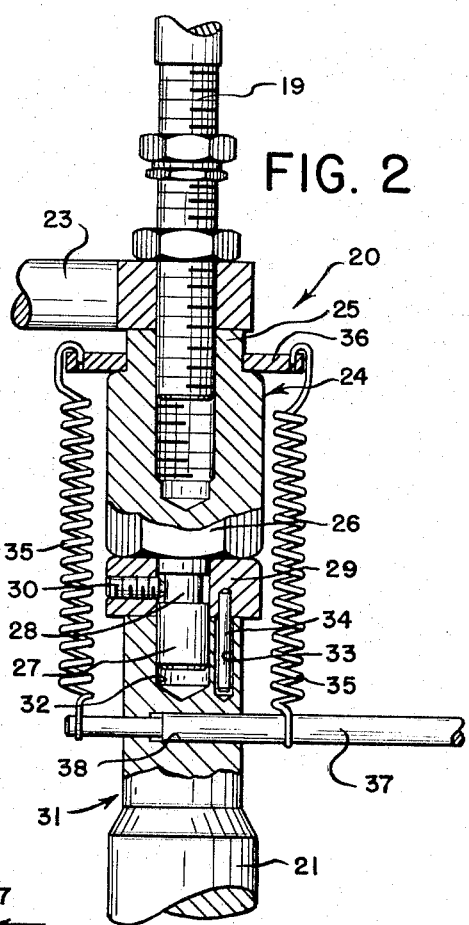

These and other novel features of the connector of the invention are shown in the accompanying drawings in which FIG. 1 is a side elevation, partly in cross-section, of a blending valve assembly including the connector of the invention; and FIG. 2 is a side elevation, partly in cross-section, showing greater detail of the connector of FIG. 1.

The blending valve is positioned at the lower end of the assembly shown in FIG. 1. The valve comprises a valve body 5 provided with a cold water inlet 6, a hot water inlet 7 and a temperate water outlet 8. The interior of the valve body is provided with a bell-shaped valve member 10 the sides of which form a cylindrical sleeve portion. This sleeve portion of the valve is provided with a cold water window 11 and a hot water window 12, the shapes of the windows being generally different from one another and such as to provide the desired proportioning of the cold and hot water as the valve is opened by moving the windowed sleeve portion axially with respect to the cold and hot water inlets 6 and 7. The shapes of the windows 11 and 12 are also such that when the sleeve is rotated on its axis, the proportioning of cold and hot water is altered in an adjustable manner. The top of the bell 10 is provided with a port 13 communicating with an outlet post 13a to provide a pressure-sensing tap for the valve outlet 8.

The blending valve control element is positioned at the upper end of the assembly shown in the drawing. This control element comprises a pressure actuator of conventional form and having a housing 14 and a diaphragm 15. The chamber defined by the top of the housing and the diaphragm communicates through an outlet 16 to the cold water supply so as to be sensitive to its pressure. The chamber defined by the diaphragm and the bottom of the housing communicates through another outlet 17 to the temperate water demand line from the valve outlet 8 through the port 13a and the port 13 so as to be sensitive to the demand line pressure. When a demand is created for temperate water by the opening of a faucet, the pressure falls in the demand line, and the resulting differential in pressure across the diaphragm 15 causes the diaphragm to move downwardly against the action of a loading spring 18. This movement is imparted to the blending valve through a valve stem assembly composed of a control element stem 19, a yielding safety connector 20 of the present invention and a blending valve stem 21, all appropriately supported within an open valve stem frame 22.

The control element stem 19, in addition to carrying a steam control rod 23, is screwed into a recess in a control element portion 24 of the connector 20. The upper end of the control element portion 24 is provided with a cylindrical neck 25 and the remainder of this portion is provided with an external hexagonal shape 26 capable of being engaged by a wrench. The lower end of the control element portion of the connector is further provided with an axially extending projection 27 advantageously having an upper collar portion 28 of reduced thickness. A washer 29 is mounted on the projection 27 and is provided with a set screw 30 adapted to engage the collar 28 and thus be locked to the projection 27 of the control element portion of the connector.

The blending valve portion of the connector comprises an extended portion 31 of the blending valve stem 21 having an axial recess 32 in its upper end. This recess is adapted to freely receive the projection 27 of the control element portion of the connector. The blending valve portion 31 is further provided with an off-center longitudinal keyway recess 33, and the washer 29 is provided with a pin or key 34 adapted to engage the keyway 33. Accordingly, the blending valve portion 31 of the connector cannot rotate with respect to the washer 29 because of their key and keyway interconnection, and the washer 29 is locked by the set screw 30 in any desired rotational position with respect to the projection 27 of the control element portion 24 of the connector. Nevertheless, the projection 27 is free to move axially within the recess 32 of the blending valve portion 31 of the connector, and to hold the two connector portions 24 and 31 together they are interconnected by two or more coil springs 35 each engaging at one end a washer 36 mounted on the neck 25 of the control element portion 24 and each engaging at the other end a rod 37 extending through a transverse opening 38 in the blending valve portion 31.

It will be seen, accordingly, that the coil springs 35 maintain the control element portion 24 and the blending valve portion 31 of the connector in a fixed relative position as long as there is no interference with free movement of the blending valve sleeve. However, if there should develop some impediment to closure of the blending valve by axial movement of the sleeve, the control element stem 19 is still free to be returned to its no-demand position by the load spring 18 and thus return the steam control rod 23 to the no-demand water-heating position. In spite of this yielding feature of the connector, the connector is nevertheless capable of being adjusted to provide the desired rotational position of the blending valve sleeve windows with respect to the cold and hot water inlets, and this adjustment position can be locked by the set screw 30 and by the key 34 in the keyway 33 in order to provide a set position guaranteed against disturbance by vibration. The rod 37 which serves as an anchor for the coil springs 35 is also used as the means for accomplishing, and as an indicator for, rotational adjustment of the blending valve sleeve.

The yielding safety connector of this invention is not limited to use in a blending valve of the type hereinbefore described but can be used with advantage in any control valve embodying a mechanical linkage for axial or rotational movement interconnecting a control element with a valve or other control member. Such devices include diaphragm control valves, control pilots, pressure regulators, and the like.

We claim:

1. An anti-vibration lock and yielding safety connector for interposition between a control member and a control element for said member, the connector comprising a control element portion and a control member portion, one of said portions having an axially extending projecting portion and the other portion having an axially positioned recess adapted to receive the projecting portion in axially slidable relation, the portion of the connector having the recess being further provided with a longitudinally extending keyway, a locking element adapted to be secured to the projecting portion and being provided with a projecting key portion adapted to slidably engage the keyway in the other portion of the connector, and resilient means interconnecting the control element portion and the control member portion of the connector.

2. An anti-vibration lock and yielding safety connector for interposition between a control member and a control element for said member, the connector comprising a control element portion having an axially extending projecting portion, a control member portion having an axially positioned recess adapted to receive the projecting portion of the control element portion in axially slidable relation, the control member portion being provided with a longitudinally extending keyway, a locking element adapted to be rotatably adjustably secured to the projecting portion of the control element portion, the locking element being provided with a projecting key portion adapted to slidably engage the keyway in the control member portion, and resilient means interconnecting the control element portion and the control member portion of the connector.

3. An anti-vibration lock and yielding safety connector for interposition between a hot water blending valve and a control element for said valve, the connector comprising a control element portion and a blending valve portion, one of said portions having an axially extending projecting portion and the other portion having an axially positioned recess adapted to receive the projecting portion in axially slidable relation, the portion of the connector having the recess being further provided with a longitudinally extending keyway, a locking element adapted to be radially adjustably secured to the projecting portion and being provided with a projecting key portion adapted to slidably engage the keyway in the other portion of the connector, and resilient means interconnecting the control element portion and the blending valve portion of the connector.

4. An anti-vibration lock and yielding safety connector for interposition between a hot water blending valve and a control element for said valve, the connector comprising a control element portion having an axially extending projecting portion, a blending valve portion having an axially positioned recess adapted to receive the projecting portion of the control element portion in axially slidable relation, the blending valve portion being provided with a longitudinally extending keyway, a locking element adapted to be rotatably adjustably secured to the projecting portion of the control element portion, the locking element being provided with a projecting key portion adapted to slidably engage the keyway in the blending valve portion, and resilient means interconnecting the control element portion and the blending valve portion of the connector.

5. In the blending hot water system including a blending valve having cold and hot water inlets and a temperate water outlet, a blending valve control sleeve within the blending valve and having flow-control windows adapted to be positioned in blending- and flow-control positions with respect to said cold and hot water inlets by rotation of the sleeve about its axis and by axial movement of the sleeve, respectively, a valve stem connected to the blending valve control sleeve, a blending valve control element responsive to a differential in pressure between an inlet side and the outlet side of the blending valve and connected to the blending valve by a mechanical linkage, and a steam control element between the blending valve control element and the mechanical linkage, the improvement which comprises a yieldable adjusting element for the blending valve interposed in the mechanical linkage between the blending valve and the blending valve control element, said yieldable adjusting element including a control element portion secured to the blending valve control element and having an axially extending section, a blending valve portion having an axially positioned recess for slidably receiving said extending section, a keyway formed longitudinally in said blending valve portion, and adjusting portion secured in rotatably adjustable position on the extending section of the control element portion, a projecting key mounted on said adjusting portion and extending slidably into said keyway, and resilient means interconnecting the control element portion and the blending valve portion.

References Cited

UNITED STATES PATENTS

| | | | |
|---|---|---|---|
| 1,220,823 | 3/1917 | Burke | 251—61 |
| 1,464,767 | 8/1923 | Kerns | 251—61 |

M. CARY NELSON, *Primary Examiner.*

W. R. CLINE, *Assistant Examiner.*